US012686625B2

(12) United States Patent
Devlin et al.

(10) Patent No.: US 12,686,625 B2
(45) Date of Patent: Jul. 21, 2026

(54) SIMULTANEOUS NITRITATION AND DENITRITATION SYSTEM

(71) Applicant: Nexom, Winnipeg (CA)

(72) Inventors: Tanner Devlin, Winnipeg (CA); Merle Kroeker, Winnipeg (CA); Martin Hildebrand, Winnipeg (CA)

(73) Assignee: Nexom, Winnipeg (CA)

( * ) Notice: Subject to any disclaimer, the term of this patent is extended or adjusted under 35 U.S.C. 154(b) by 478 days.

(21) Appl. No.: 18/322,018

(22) Filed: May 23, 2023

(65) Prior Publication Data

US 2024/0002268 A1 Jan. 4, 2024

Related U.S. Application Data

(60) Provisional application No. 63/347,090, filed on May 31, 2022.

(51) Int. Cl.
| | |
|---|---|
| *C02F 3/30* | (2023.01) |
| *C02F 3/00* | (2023.01) |
| *C02F 3/08* | (2023.01) |
| *C02F 101/16* | (2006.01) |

(52) U.S. Cl.
CPC ............. *C02F 3/301* (2013.01); *C02F 3/006* (2013.01); *C02F 3/08* (2013.01); *C02F 3/302* (2013.01); *C02F 2101/163* (2013.01); *C02F 2101/166* (2013.01); *C02F 2209/22* (2013.01); *C02F 2305/06* (2013.01)

(58) Field of Classification Search
CPC .......... C02F 3/302; C02F 3/301; C02F 3/006; C02F 3/08; C02F 3/06; C02F 3/10; C02F 2101/163; C02F 2101/166; C02F 2209/22; C02F 2305/06
USPC ........................................................ 210/615
See application file for complete search history.

(56) References Cited

U.S. PATENT DOCUMENTS

| | | | |
|---|---|---|---|
| 8,246,830 B2 | 8/2012 | Takeda | |
| 2006/0249449 A1* | 11/2006 | Nakhla | C02F 3/1273 |
| | | | 210/906 |
| 2013/0319940 A1* | 12/2013 | Josse | C02F 3/2833 |
| | | | 210/151 |
| 2014/0263042 A1 | 9/2014 | Giraldo et al. | |
| 2021/0002154 A1* | 1/2021 | Trivedi | C02F 1/52 |

FOREIGN PATENT DOCUMENTS

| | | |
|---|---|---|
| CA | 2542894 | 10/2007 |
| CN | 106517516 | 3/2017 |
| CN | 108046540 | 5/2018 |
| CN | 108529748 | 7/2021 |

* cited by examiner

*Primary Examiner* — Claire A Norris

(74) *Attorney, Agent, or Firm* — Michael R Williams; Ryan W Dupuis; Ade & Company Inc

(57) ABSTRACT

The reduction of only the soluble fraction of organic matter prior to SND systems enhances nitrification rates while still providing residual particulate and colloidal organic matter to sustain denitrification in SND systems. Surprisingly, by increasing the amount of soluble organic matter reduced by conversion to biomass or microbial product and decreasing the amount of soluble organic matter reduced by oxidation to carbon dioxide prior to SND zones will still enhance nitrification rates while providing even more particulate and colloidal organic matter to improve denitrification in the SND zones.

12 Claims, No Drawings

SIMULTANEOUS NITRITATION AND DENITRITATION SYSTEM

The instant application claims the benefit of U.S. Provisional Patent Application 63/347,090, filed May 31, 2022, entitled "IMPROVED SIMULTANEOUS NITRITATION AND DENITRITATION SYSTEM", the entire contents of which are incorporated herein by reference for all purposes.

BACKGROUND OF THE INVENTION

Conventional biological nitrification and denitrification treatment systems use suspended and/or attached growth and vary the oxidation reduction potential in space and/or time to optimize the individual biochemical reactions of nitrification and denitrification at different stages in space and/or time.

Conventional simultaneous nitrification and denitrification (SND) systems use suspended and/or attached growth at relatively constant oxidation reduction potential to allow biochemical reactions of nitrification and denitrification to occur in a single stage while compromising on the efficiency of individual nitrification and denitrification rates.

It is well known that reduction of all organic matter prior to SND systems will enhance nitrification rates but inhibit denitrification rates.

SUMMARY OF THE INVENTION

According to an aspect of the invention, there is provided a method for simultaneous nitritation and denitritation system comprising: providing a simultaneous nitritation and denitritation system comprising: a first attached growth zone configured to receive a quantity of influent; and a second attached growth zone downstream of the first attached growth zone and configured to receive a quantity of treated influent from the first attached growth zone; said first attached growth zone receiving a quantity of influent and reducing soluble organic matter within the quantity of influent by converting the soluble organic matter to biomass or microbial product, thereby providing a treated influent that is at least 50% particulate, colloidal, or microbial product organic matter; and said second attached growth zone performing simultaneous nitrification and denitrification or simultaneous nitritation and denitritiation on the quantity of treated influent and releasing a treated effluent.

According to another aspect of the invention, there is provided a system for simultaneous nitritation and denitritation comprising: a first attached growth zone configured to receive a quantity of influent and reduce soluble organic matter within the quantity of influent by converting the soluble organic matter to biomass or microbial product, and a second attached growth zone downstream of the first attached growth zone and configured to receive a quantity of treated influent from the first attached growth zone and perform simultaneous nitrification and denitrification or simultaneous nitritation and denitritiation on the quantity of treated influent.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

The reduction of only the soluble fraction of organic matter prior to SND systems enhances nitrification rates while still providing residual particulate and colloidal organic matter to sustain denitrification in SND systems.

Surprisingly, by increasing the amount of soluble organic matter reduced by conversion to biomass or microbial product and decreasing the amount of soluble organic matter reduced by oxidation to carbon dioxide prior to SND zones will still enhance nitrification rates while providing even more particulate and colloidal organic matter to improve denitrification in the SND zones.

For example, an organically polluted wastewater may contain 200 mg/l of total cBOD5 of which 100 mg/l is soluble cBOD5. Conventional systems that reduce only the soluble cBOD5 typically do so by conversion to carbon dioxide and some biomass, resulting in a residual total cBOD5 of approximately 100-150 mg/l depending on the biomass yield. By changing the soluble organic matter reduction pathway, it is possible to convert a smaller fraction, for example 5-20%, of the soluble cBOD5 to carbon dioxide while converting the remaining fraction to particulate and colloidal organic matter, resulting in a residual total cBOD5 of approximately 180-195 mg/l. This higher residual organic matter will allow for more denitrification, which typically requires 4 g-carbon/g-nitrogen removed, while minimizing the impact on nitrification rates which can be completely inhibited at cBOD5 loads of $3.6$ g-cBOD5/m$^2$/d and greater in conventional attached growth systems, whereas nitrification may persist at loads greater than 4 g-cBOD5/m$^2$/d with a majority of cBOD5 as particulate or colloidal organic matter.

To further surprise, by allowing more particulate and colloidal organic matter into SND zones and controlling operating parameters such as dissolved oxygen, oxidation reduction potential, and pH, simultaneous nitritation (oxidation of ammonia molecule to nitrite, the first step of nitrification) and denitritation (reduction of nitrite to nitrogen gas, the second step of denitrification) can be supported in SND systems resulting in more efficient operation due to lower energy and chemical requirements than conventional simultaneous nitrification and denitrification. The onset of nitritation typically occurs at cBOD5 loads of 1-5 g-cBOD5/ m$^2$/d depending on the controlled conditions such as dissolved oxygen (ranging from 0-6 mg/l), oxidation reduction potential (ranging from $-250$ to $+350$ mV), and pH (ranging from 5-10).

Additionally, the SND system is better protected from septicity, toxicity, and other perturbations when following an aerobic or anoxic system that has been designed to reduce the amount of soluble organic matter by conversion to particulate and colloidal organic matter. Firstly, the higher oxidation reduction potential, for example greater than $-50$ mV, in the aerobic or anoxic system will convert toxic compounds, such as sulfides, to non-toxic compounds, mitigating the toxicity that would otherwise be a risk in the SND system. Secondly, the faster growing heterotrophic microorganism in the aerobic or anoxic system will be first impacted by perturbations, allowing for a biological buffer prior to the SND system that will also more quickly recover than the autotrophs in the SND system that would otherwise be exposed to perturbations directly without buffer.

According to an aspect of the invention, there is provided a method for simultaneous nitritation and denitritation system comprising:

providing a simultaneous nitritation and denitritation system comprising:

a first attached growth zone configured to receive a quantity of influent; and a second attached growth zone downstream of the first attached growth zone and configured to receive a quantity of treated influent from the first attached growth zone;

said first attached growth zone reducing soluble organic matter within the quantity of influent by converting the soluble organic matter to biomass or microbial product, thereby providing a treated influent that is at least 50% particulate. colloidal, or microbial product organic matter;

said second attached growth zone performing simultaneous nitrification and denitrification or simultaneous nitritation and denitritiation on the quantity of treated influent.

According to an aspect of the invention, there is provided a system for simultaneous nitritation and denitritation comprising:

a first attached growth zone configured to receive a quantity of influent and reduce soluble organic matter within the quantity of influent by converting the soluble organic matter to biomass or microbial product, a second attached growth zone downstream of the first attached growth zone and configured to receive a quantity of treated influent from the first attached growth zone and perform simultaneous nitrification and denitrification or simultaneous nitritation and denitritiation on the quantity of treated influent.

In one embodiment of the invention, the system comprises an attached growth reactor comprising a first attached growth zone that reduces soluble organic matter by increasing the fraction that is converted to biomass or microbial product followed by a second attached growth zone that performs simultaneous nitrification and denitrification or simultaneous nitritation and denitritiation that is supplemented by the reduction of soluble organic matter by conversion into biomass or microbial product.

According to another aspect of the invention, there is provided an attached growth reactor comprising: a first attached growth zone having inlet through which influent, with typically 10-100%, for example, 20-80% soluble organic matter, is introduced to the first attached growth zone; a second attached growth zone situated downstream of the first attached growth zone receiving effluent or treated influent, now with greater than 50% particulate or colloidal organic matter, from the first attached growth zone.

In some embodiments of the invention, the first attached growth zone reduces soluble organic matter under aerobic or anoxic conditions, as discussed herein.

As will be appreciated by one of skill in the art, the conditions in the first attached growth zone are such that the portion of soluble organic matter that is oxidized, converted into new biomass, or converted in microbial product is controlled, as discussed herein.

For example, the portion of soluble organic matter that is oxidized, converted into new biomass, or converted in microbial product may be controlled by, for example, but by no means limited to:

a) dissolved oxygen control of the oxygen supply system, such as air supply blowers or liquid oxygen injection, to induce continuous or intermittent dissolved oxygen limited conditions (for example, less than 2 mg/l) as required to influence the portion of soluble organic matter that is oxidized, converted into new biomass, or converted in microbial product; b) controlling the food to microorganism ratio within the system to induce high food to microorganism ratios (for example, greater than 1), such as periodic removal and replacement of media, in situ low pH (less than 5) and high pH (greater than 10) soaks, and chemical oxidant addition such as chlorine or ozone, to influence the portion of soluble organic matter that is oxidized, converted into new biomass, or converted in microbial product; or c) nutrient level control of the system to induce nutrient limited conditions (for example, less than 10 C:1 N or 100 C:1 P), such as addition of chemical coagulants like ferric or alum to reduce bioavailable phosphorus levels and carbon dosing to increase the relevant concentration of carbon to nitrogen and phosphorus, to influence the portion of soluble organic matter that is oxidized, converted into new biomass, or converted in microbial product.

In this manner, the soluble organic matter content of the influent is reduced, for example by 50% to near 100% during production of the treated influent in the first attached growth zone, through maximizing the portion of soluble organic matter converted into new biomass or microbial product within reason of biological limitations, for example 50% to near 100% of the total amount of soluble organic matter reduced.

As a result of this arrangement, an effluent containing organic matter that is more slowly-biodegradable, for example, containing greater than 50% particulate or colloidal organic matter, than the soluble organic matter in the untreated influent is produced. In this treated influent, competition for oxygen between microorganisms removing organic matter and microorganisms removing ammonia in downstream processes in the second attached growth zone is minimized, as discussed herein.

As discussed herein, the second attached growth zone simultaneously reduces the ammonia and nitrite/nitrate content under aerobic (for example 0-6 mg/l dissolved oxygen) or anoxic (for example −250 to +350 mV) conditions. The aerobic or anoxic conditions could be constant or alternate at a controlled interval, for example but by no means limited to constant at +50 mV or alternating between >0.5 mg/l dissolved oxygen and less than −150 mV.

As known to those of skill in the art, the nature of raw wastewater fractions varies considerably; accordingly, it is of note that Zone 1 effluent would still produce more particulate/colloidal/microbial product that in the raw influent, for example, >60% particulate/colloidal/microbial product. For illustrative purposes, in some embodiments, the treated influent comprises greater than 50% particulate, colloidal, or microbial product organic matter, than the soluble organic matter in the untreated influent and high in organic nitrogen, ammonia, and/or nitrite.

In some embodiments, the ammonia and nitrite/nitrate removal rates are controlled in the second attached growth zone.

As will be appreciated by one of skill in the art, any method known in the art for influencing ammonia and nitrite/nitrate removal rates, for example but by no means limited to dissolved oxygen levels (sustaining <2 mg/l dissolved oxygen for greater than an appreciable amount of time, for example, 1 minute) and external carbon addition (raising bulk liquid soluble organic matter to >5 mg/l as cBOD5) may be used in the second attached growth zone.

In some embodiments, the system comprises a Moving Bed Biofilm Reactor (MBBR). An MBBR is a flow-through biological treatment system that utilizes attached growth biomass growing as a biofilm on specialized media carrier elements that are completely mixed throughout the system. The media is retained in their designated zones in the system by specially designed retention screens, allowing for continuous, uninterrupted flow of treated water through the MBBR.

As discussed herein, the system comprises two (2) MBBR zones in series. The first zone will comprise an aerobic Carbon Conversion (CC) MBBR while the second zone will comprise an aerobic/anoxic Simultaneous Nitrification Denitrification (SND) MBBR. As will be apparent to one of skill in the art, as used herein, a "zone" can comprise single or multiple tanks in parallel or series. That is, both zones may be in one tank or may be spread between several tanks in parallel or series.

In one embodiment of the invention, aerobic conditions are achieved in both zones/tanks through forced aeration by air supply blowers driving air through bottom-mounted diffusers in each MBBR zone/tank; however, other methods of delivering dissolved oxygen known in the art, such as, for example but by no means limited to chemically or through nanobubble technology, are also within the scope of the invention.

Anoxic conditions are achieved in the second SND-MBBR tank through the prolonged stoppage of aeration, which will result in the rapid consumption of oxygen in the bulk liquid. In some embodiments, optional mechanical mixers provide optimal mixing of the liquid and media in the absence of aeration. Other methods of supplemental mixing, such as big bubble mixers, may also be used to supplement the mixing providing by aeration and are within the scope of the invention. As will be appreciated by one of skill in the art, supplemental mixing is not required, but recommended to increase denitrification kinetics under anoxic conditions.

In some embodiments, an optional chemical dosing system for external carbon is supplied for the second SND-MBBR tank. External carbon may be supplied to the second tank during anoxic conditions when the aeration is stopped. External carbon will enhance denitrification rates under anoxic conditions, resulting in accelerated nitrogen removal. External carbon would be dosed to achieve a ratio of 4 g of cBOD5 per g of N reduced if sufficient carbon was not present in the influent. External carbon may comprise, but it not limited to, methanol, ethanol, glycerin, acetate, glucose, and the like.

As discussed above, the MBBR system is a flow-through biological treatment system that utilizes attached growth biomass growing as a biofilm on specialized media carrier elements that are completely mixed throughout the system. The media is retained in the system by specially designed retention screens, allowing for continuous, uninterrupted flow of treated water through the MBBR. The MBBR will be comprised of two major unit processes in series:

1. A first-stage CC-MBBR
2. A second-stage SND-MBBR

The system will generally target to produce an effluent with <5 mg/l ammonia as nitrogen and <15 mg/l total nitrogen but can be designed to achieve <1 mg/l ammonia as nitrogen and <3 mg/l total nitrogen. The removal of ammonia from wastewater is important because ammonia is acutely toxic at elevated concentrations, generally greater than 5 mg/l ammonia as nitrogen and can be chronically toxic at concentrations as low as 1 mg/l ammonia as nitrogen. The removal of nitrogen from wastewater is also important because nitrogen contributes to the eutrophication of receiving water bodies and can contaminate drinking water sources by elevating nitrate concentrations above drinking water guidelines.

The CC-MBBR is generally a single-stage process of one or more tanks in parallel. However, the CC-MBBR can be separated into multiple stages in series as required by the specific application.

The single- or multi-stage CC-MBBR is designed based on a loading rate of 10-20 g-cBOD5/m$^2$/d at a reference temperature 10° C. relative to the surface area available for biofilm growth in all stages and parallel reactors. The range of loading rates can be extended to 1-60 g-cBOD5/m$^2$/d as required by the specific application.

The CC-MBBR is designed to operate on average (e.g. continuously or intermittently) at 0.5-1 mg/l of residual oxygen, although this range can be extended up to 2 mg/l on average. Furthermore, the CC-MBBR may also operate as low as 0 mg/l of residual oxygen on average. If the CC-MBBR operates at 0 mg/l of residual oxygen on average, an optional nitrified effluent recycle may be operated to bring nitrates to the CC-MBBR. The optional nitrified effluent recycle would typically operate at 100-300% of the influent flow. However, the range of nitrified effluent recycle flow could be expanded to any non-zero number as required.

In one configuration, aerobic conditions in the CC-MBBR are induced via air supply blowers driving air through bottom-mounted diffusers.

Anoxic conditions may also be induced in the CC-MBBR. In one configuration, anoxic conditions in the CC-MBBR are induced via the reduction and/or intermittent stoppage of air supply blowers. Mixing devices that operate independently of air supply may be supplied in both the CC-MBBR and the SND-MMBR. For example, in one configuration, vertically-mounted mechanical mixers operate continuously in the CC-MBBR. Microorganisms in the CC-MBBR will utilize oxygen or nitrates to metabolize soluble organic matter and convert the organic matter to particulate or colloidal organic matter under oxidant (e.g. oxygen, nitrate, etc.) limiting conditions. The resulting effluent from the CC-MBBR is suitable for enhanced SND in the SND-MBBR since the more slowly biodegradable particulate and colloidal organic matter will better match the biodegradability rates of ammonia, resulting in more efficient ammonia oxidation through nitrification and more efficient utilization of organic matter for denitrification.

While the preferred embodiments of the invention have been described above, it will be recognized and understood that various modifications may be made therein, and the appended claims are intended to cover all such modifications which may fall within the spirit and scope of the invention.

TABLE 1

| | Comparison with conventional methods | | | |
| --- | --- | --- | --- | --- |
| Parameter | Conventional Pre-denitrification | Conventional Post-denitrification | Test train High estimate | Test train Low estimate |
| Media, m$^3$ | 205 | 156 | 354 (123-227%) | 184 (90-118%) |
| AOR, kg-O$_2$/d | 394 | 470 | 297 (63-75%) | 187 (40-47%) |
| External Carbon Kg-BOD/d | 32 | 120 | 0 | 0 |

7
8

The invention claimed is:

1. A method for simultaneous nitritation and denitritation system comprising:

providing a simultaneous nitritation and denitritation system comprising:

a first attached growth zone configured to receive a quantity of influent; and a second attached growth zone downstream of the first attached growth zone and configured to receive a quantity of treated influent from the first attached growth zone;

said first attached growth zone receiving a quantity of influent and reducing soluble organic matter within the quantity of influent by converting the soluble organic matter to biomass or microbial product, thereby providing a treated influent wherein at least 50% of the organic matter by weight is particulate, colloidal, or microbial product organic matter; and said second attached growth zone simultaneously reducing the ammonia and nitrate/nitrite content under aerobic or anoxic conditions by performing simultaneous nitrification and denitrification or simultaneous nitritation and denitritiation on the quantity of treated influent and releasing a treated effluent, wherein the aerobic and anoxic conditions alternate at a controlled interval.

2. The method according to claim 1 wherein the first attached growth zone reduces soluble organic matter under aerobic or anoxic conditions.

3. The method according to claim 2 wherein the soluble organic matter that is reduced is oxidized, converted into new biomass, or converted in microbial product.

4. The method according to claim 3 wherein reduction of the soluble organic matter is controlled by:

a) dissolved oxygen control of the oxygen supply system to induce continuous or intermittent dissolved oxygen limited conditions;

b) controlling the food to microorganism ratio to induce high food to microorganism ratios; or C nutrient level control of the system to induce nutrient limited conditions.

5. The method according to claim 4 wherein the nutrient limited conditions are less than 10 C:1 N or less than 100 C:1 P.

6. The method according to claim 1 wherein the aerobic and anoxic conditions alternate between >0.5 mg/l dissolved oxygen and less than −50 oxidation reduction potential (ORP).

7. A system for simultaneous nitritation and denitritation comprising:

a first attached growth zone configured to receive a quantity of influent and reduce soluble organic matter within the quantity of influent by converting the soluble organic matter to biomass or microbial product for providing a treated influent wherein at least 50% of the organic matter by weight is particulate, colloidal or microbial product organic matter, and a second attached growth zone downstream of the first attached growth zone and configured to receive a quantity of treated influent from the first attached growth zone and simultaneously reduce the ammonia and nitrate/nitrite content under aerobic or anoxic conditions by performing simultaneous nitrification and denitrification or simultaneous nitritation and denitritiation on the quantity of treated influent and releasing a treated effluent, wherein the aerobic and anoxic conditions alternate at a controlled interval.

8. The system according to claim 7 wherein the first attached growth zone is configured to reduce soluble organic matter under aerobic or anoxic conditions.

9. The system according to claim 7 wherein the first attached growth zone is configured to reduce the soluble organic matter by:

a) dissolved oxygen control of the oxygen supply system to induce continuous or intermittent dissolved oxygen limited conditions;

b) controlling the food to microorganism ratio to induce high food to microorganism ratios; or c) nutrient level control of the system to induce nutrient limited conditions.

10. The system according to claim 7 wherein the aerobic or anoxic conditions are constant.

11. The system according to claim 7 wherein the aerobic and anoxic conditions alternate between >0.5 mg/l dissolved oxygen and less than −50 oxidation reduction potential (ORP).

12. The system according to claim 9 wherein the nutrient limited conditions are less than 10 C:1 N or less than 100 C:1 P.

* * * * *